US009457723B2

(12) United States Patent
Engerman

(10) Patent No.: US 9,457,723 B2
(45) Date of Patent: Oct. 4, 2016

(54) VEHICLE STORAGE TRAY ASSEMBLY

(71) Applicant: Nissan North America, Inc., Franklin, TN (US)

(72) Inventor: Eric Engerman, Northvile, MI (US)

(73) Assignee: Nissan North America, Inc., Franklin, TN (US)

( * ) Notice: Subject to any disclaimer, the term of this patent is extended or adjusted under 35 U.S.C. 154(b) by 66 days.

(21) Appl. No.: 14/502,266

(22) Filed: Sep. 30, 2014

(65) Prior Publication Data

US 2016/0090046 A1 Mar. 31, 2016

(51) Int. Cl.
  *B62D 43/10* (2006.01)
  *B60R 5/04* (2006.01)
  *B62D 65/02* (2006.01)
  *B60R 11/06* (2006.01)
  *B60R 11/00* (2006.01)

(52) U.S. Cl.
  CPC ............... *B60R 5/044* (2013.01); *B60R 5/04* (2013.01); *B60R 11/06* (2013.01); *B62D 43/10* (2013.01); *B62D 65/02* (2013.01); *B60R 2011/0036* (2013.01)

(58) Field of Classification Search
  CPC .................................................. B62D 43/10
  USPC ....... 206/585, 589, 562, 563, 433, 234, 373; 224/42.12, 42.13, 42.14, 42.2, 42.23, 224/42.24, 539, 541, 542; 296/37.2, 37.3
  See application file for complete search history.

(56) References Cited

U.S. PATENT DOCUMENTS

| 697,247 | A | * | 4/1902 | Harris | B65D 71/72 206/19 |
| 2,151,503 | A | * | 3/1939 | Dowst | B65D 5/5038 206/486 |
| 2,366,886 | A | * | 1/1945 | Van Tuyl | B65D 73/005 206/3 |
| 3,154,209 | A | * | 10/1964 | Wilhite | B65D 85/20 211/74 |
| 3,241,661 | A | * | 3/1966 | Zamzow | B65D 81/022 206/433 |

(Continued)

FOREIGN PATENT DOCUMENTS

| DE | 3830228 A1 | * | 3/1990 | ............... B60R 7/02 |
| FR | 2657836 A1 | * | 8/1991 | ............. B62D 43/10 |

(Continued)

*Primary Examiner* — H Gutman
(74) *Attorney, Agent, or Firm* — Global IP Counselors, LLP

(57) ABSTRACT

A first member of a storage tray assembly has first and second planar surfaces parallel to one another. A first cut-out extends from the first planar surface to the second planar surface. A second member has third and fourth planar surfaces parallel to one another. A second cut-out extends from the third planar surface to the fourth planar surface. The second cut-out aligns with first cut-out when the first and second members overlay and attach to one another. A third member has fifth and sixth planar surfaces parallel to one another. The third member has first shaped surfaces extending from the fifth planar surface to the sixth planar surface. The third member is inserted into the second cut-out such that the first cut-out, the second cut-out and the plurality of first shaped surfaces of the third member define a concave storage space.

13 Claims, 7 Drawing Sheets

(56) References Cited

U.S. PATENT DOCUMENTS

| | | | | |
|---|---|---|---|---|
| 3,513,969 | A | | 5/1970 | Roff |
| 4,640,418 | A | * | 2/1987 | Lowry .................. B65D 5/509 206/499 |
| 4,836,374 | A | * | 6/1989 | Hutchins ................. A45C 3/00 206/373 |
| 4,964,514 | A | * | 10/1990 | Wycech ............... B65D 81/022 206/523 |
| 5,040,678 | A | * | 8/1991 | Lenmark, Sr. ....... B65D 81/107 206/204 |
| 5,320,223 | A | * | 6/1994 | Allen ...................... B25H 3/06 206/372 |
| 5,429,285 | A | * | 7/1995 | Kim ...................... B62D 43/10 206/373 |
| 5,799,845 | A | * | 9/1998 | Matsushita ............... B60R 5/04 224/42.14 |
| 6,062,385 | A | * | 5/2000 | Cho ......................... A45C 3/02 206/216 |
| 6,102,204 | A | * | 8/2000 | Castleberry ............ B65D 5/503 206/423 |
| 6,739,742 | B2 | | 5/2004 | Gehring et al. |
| 7,090,274 | B1 | | 8/2006 | Khan et al. |
| 7,240,798 | B1 | * | 7/2007 | Chiang ............... B65D 25/101 206/562 |
| 7,410,053 | B2 | * | 8/2008 | Bowen .................... B25H 3/06 206/370 |
| 7,708,175 | B2 | | 5/2010 | Edwards |
| 8,104,615 | B2 | * | 1/2012 | Liu ........................ B25H 3/003 206/373 |
| 8,109,389 | B1 | * | 2/2012 | Amer ................... B65D 5/5038 206/499 |
| 8,308,226 | B2 | * | 11/2012 | Parkinson .............. B60R 11/06 296/191 |
| 8,376,136 | B2 | * | 2/2013 | Arai ..................... B65D 5/5057 206/419 |
| 8,523,259 | B2 | | 9/2013 | Dawe et al. |
| 8,607,983 | B2 | * | 12/2013 | Niven .................... A61J 1/035 206/538 |
| 8,808,827 | B2 | | 8/2014 | Preisler et al. |
| 9,265,378 | B2 | * | 2/2016 | Meindl, Jr. ............. A47J 31/44 |
| 2005/0040191 | A1 | * | 2/2005 | Hwang ................. B62D 43/10 224/42.14 |
| 2007/0023307 | A1 | * | 2/2007 | Liu ....................... B25H 3/003 206/373 |
| 2010/0182368 | A1 | * | 7/2010 | Matsui .................. A63B 45/02 347/16 |

FOREIGN PATENT DOCUMENTS

| | | | | |
|---|---|---|---|---|
| GB | EP 0477620 | A2 | * | 4/1992 ........... B65D 81/113 |
| GB | 2250248 | A | * | 6/1992 ............... B60R 7/00 |

* cited by examiner

VEHICLE STORAGE TRAY ASSEMBLY

BACKGROUND

1. Field of the Invention

The present invention generally relates to a vehicle storage tray assembly. More specifically, the present invention relates to vehicle storage tray assembly that includes a plurality of members that are cut from planar stock materials such that each of the plurality of members has two opposing planar surfaces.

2. Background Information

Many current vehicles include a concave storage area that is configured to receive and store a spare tire and tire changing tools. The concave storage area and the spare tire are often covered and concealed by a tool storage tray. The tool storage tray is made using any of a variety of manufacturing techniques, such as injection molding of plastic or polymer materials and/or tool and die stamping of deformable materials. Such manufacturing techniques are costly in that the molds used in injection molding and the tool and die tools are expensive to manufacture and replace.

SUMMARY

One object of the disclosure is to produce a storage tray that is efficient to manufacture and assemble.

Another object of the disclosure is to produce a light weight storage tray that can cover a spare tire storage space and store tools such as a jack and lug nut wrench.

In view of the state of the known technology, one aspect of the disclosure relates to a vehicle storage tray assembly that includes a first member, a second member and a third member. The first member has a first planar surface and a second planar surface that are parallel to one another with a first cut-out extending from the first planar surface to the second planar surface. The second member has third planar surface and a fourth planar surface that are parallel to one another with a second cut-out extending from the third planar surface to the fourth planar surface, the second cut-out being aligned with first cut-out with the first member overlaying and being attached to the second member. The third member has a fifth planar surface and a sixth planar surface that are parallel to one another. The third member has a plurality of first shaped surfaces extending from the fifth planar surface to the sixth planar surface. The third member is inserted into the second cut-out with at least a portion of the third member being restrained within the second cut-out such that the first cut-out. The second cut-out and the plurality of first shaped surfaces of the third member define a concave storage space.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
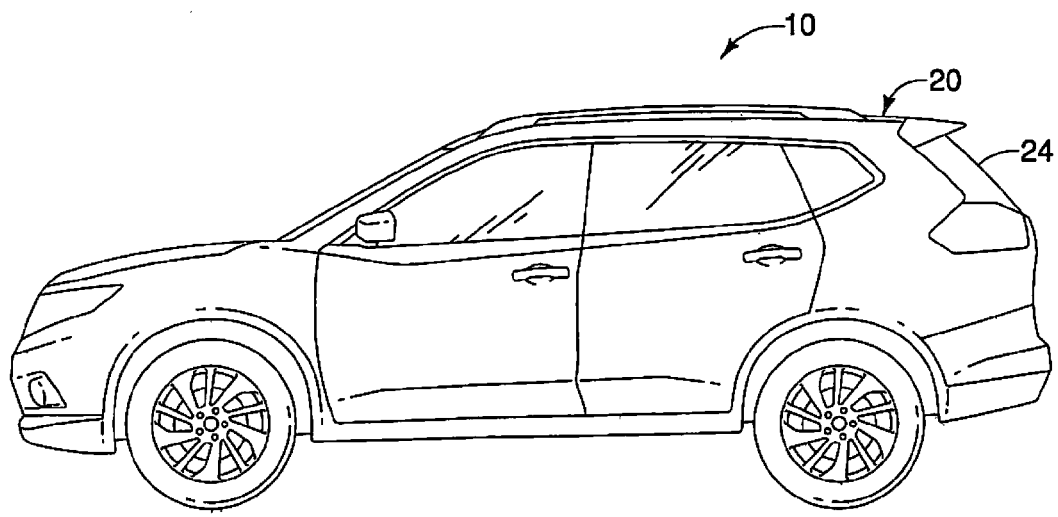
FIG. 1 is a side view of a vehicle that includes a storage tray assembly in accordance with a first embodiment.
Figure 2:
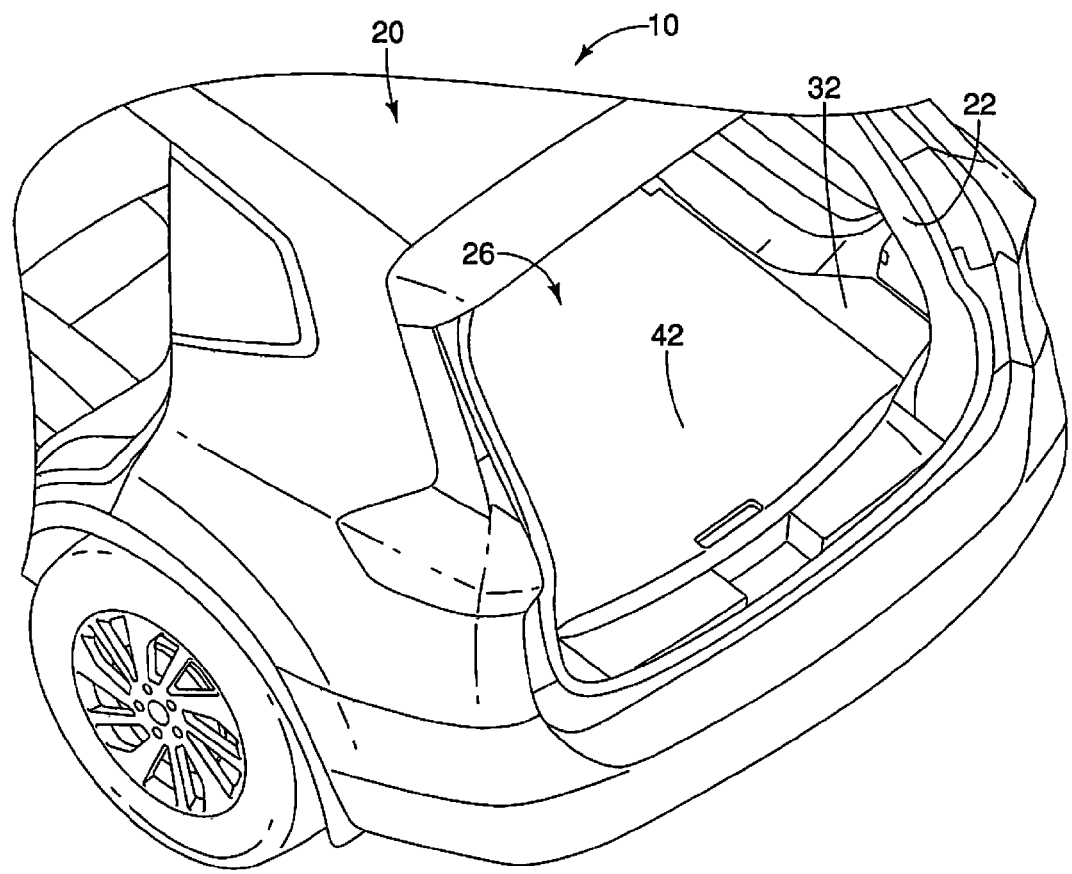
FIG. 2 is a rear perspective view of the vehicle depicted in FIG. 1 showing a rear cargo area that includes the storage tray assembly in accordance with the first embodiment.

Referring initially to FIGS. 1 and 2, a vehicle 10 is illustrated in accordance with a first embodiment. The vehicle 10 includes a storage tray assembly 12 shown in FIG. 3 and described in greater detail below following a brief description of related portions of the vehicle 10.

The vehicle 10 includes, among other features, a vehicle body structure 20 with a rear hatch opening 22, a rear hatch door 24, a rear cargo space 26, a concaved storage area 34 (FIGS. 3 and 11 only) and the storage tray assembly 12 (FIGS. 3, 7 and 9-12). As shown in FIG. 2, the rear hatch opening 22 exposes the rear cargo space 26 with the rear hatch door 24 in an open orientation. The rear hatch door 24 is shown in a closed orientation in FIG. 1, but is completely removed from the vehicle 10 in FIG. 2 to provide a view of the rear cargo space 26 within the vehicle body structure 20.

Figure 3:
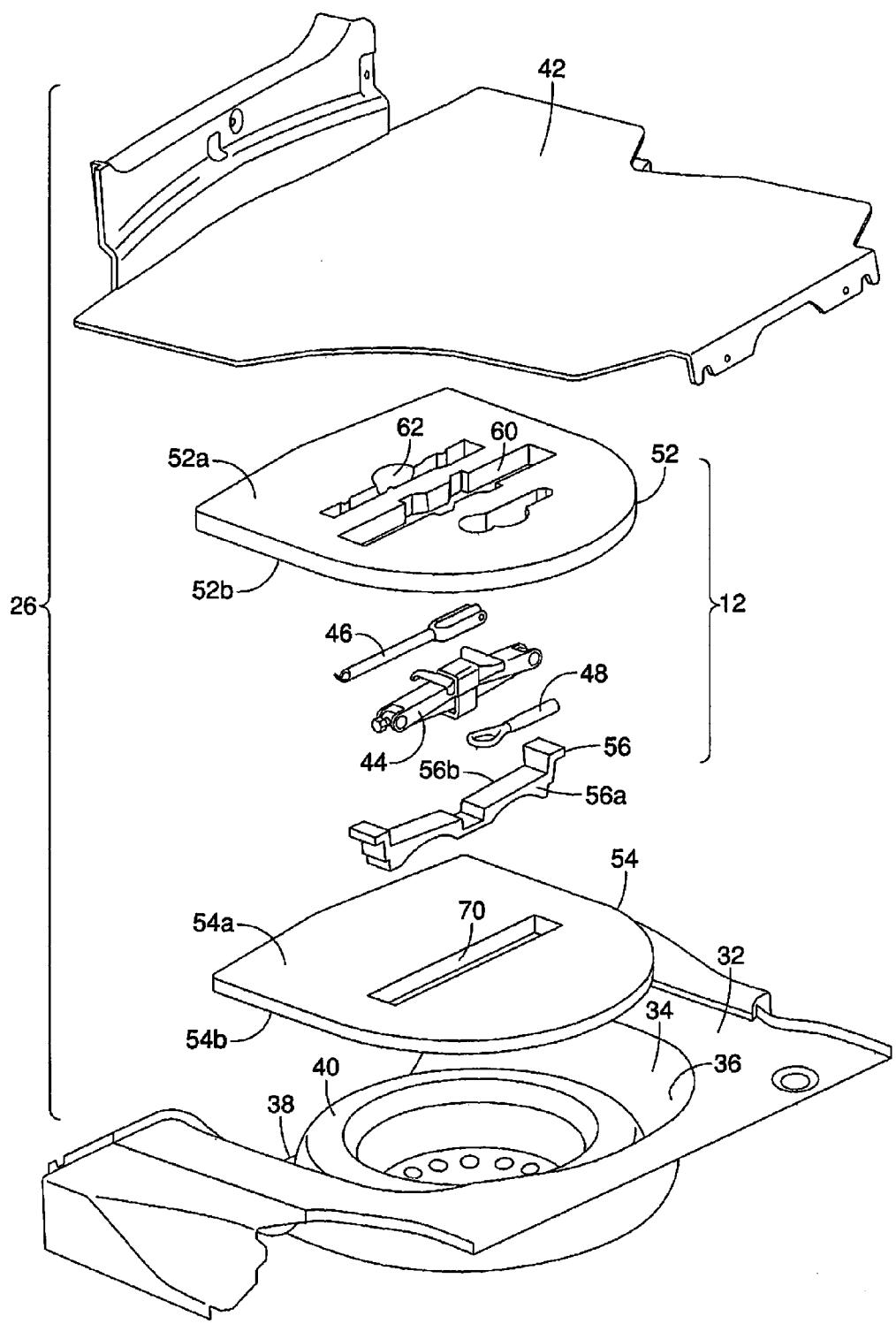
FIG. 3 is a perspective exploded view of the rear cargo area including a first member, a second member and a third member of the storage tray assembly in accordance with the first embodiment.
Figure 11:
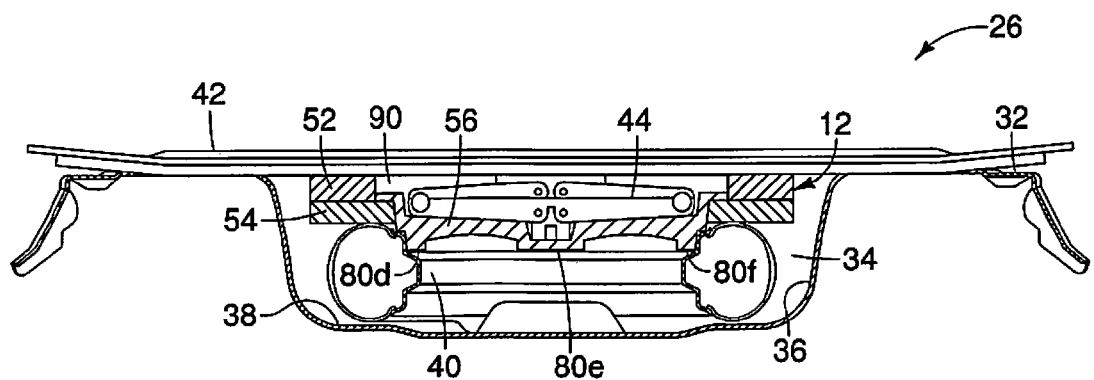
FIG. 11 is a cross-sectional view of the rear cargo area of the vehicle showing the storage tray assembly installed to and covering a spare tire in accordance with the first embodiment.

As shown in FIGS. 3 and 11, the rear cargo space 26 includes a deck 32 and the concave storage area 34. The concave storage area 34 has a curved wall portion 36 and a lower deck surface 38 below the deck 32. The curved wall portion 36 extends from the deck 32 to the lower deck surface 38. The concave storage area 34 is dimensioned to receive a spare tire 40, as shown in FIGS. 3 and 11. Since concave storage areas such as spare tire storage areas of vehicles are well known, further description is omitted for the sake of brevity.

The storage tray assembly 12 is depicted in FIG. 3 in an unassembled state above the concave storage area 34 and the spare tire 40. The storage tray assembly 12 is configured and dimensioned to overlay the spare tire 40 and the concave storage area 34, as shown in FIGS. 3 and 11. More specifically, the storage tray assembly 12 fits over the concave storage area 34 and is further covered by a decorative covering or padded carpet such as a carpet layer 42. However, it should be understood from the drawings and the description herein that the storage tray assembly 12 can have any of a variety of shapes and contours around its outer perimeter, and is not limited to the overall shape depicted. In other words, the overall shape of the storage tray assembly 12 is not limited to a shape corresponding to the concave storage area 34.

The storage tray assembly 12 is configured to receive, retain and store a plurality of tools, such as a jack 44, a lug-nut wrench 46 and a tow hook 48.

As shown in FIG. 3, the storage tray assembly 12 basically includes a first member 52, a second member 54 and a third member 56. Each of the first, second and third members 52, 54 and 56 is cut from a flat, planar stock material.

Figure 4:
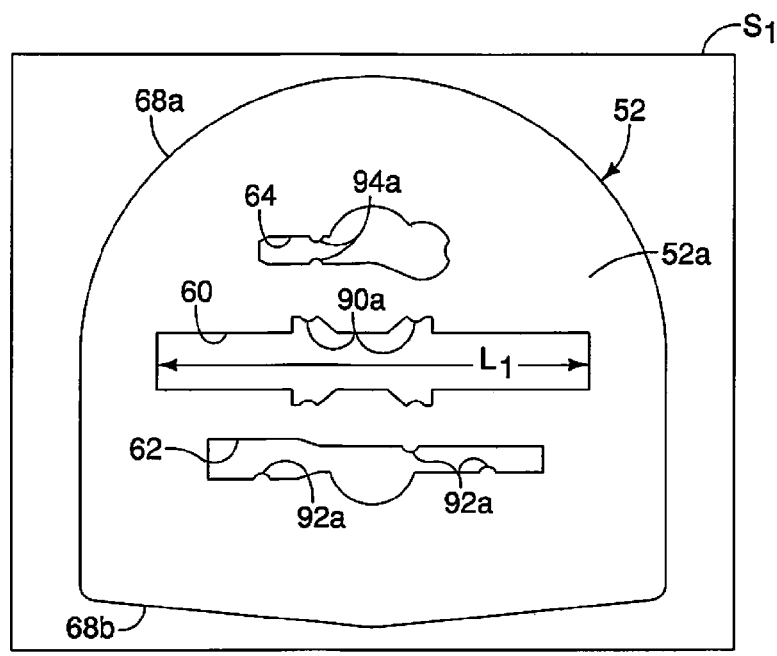
FIG. 4 is a top view of the first member of the storage tray assembly being cut from stock material showing three cut-outs being formed therein in accordance with the first embodiment.
Figure 5:
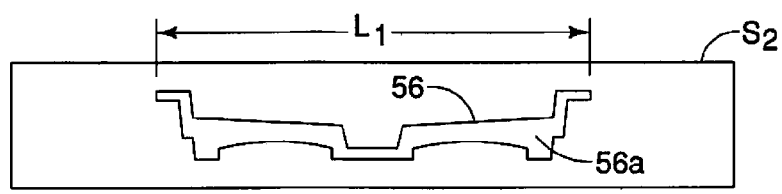
FIG. 5 is a top view of the third member of the storage tray assembly being cut from stock material showing a plurality of surfaces being formed thereon in accordance with the first embodiment.
Figure 6:
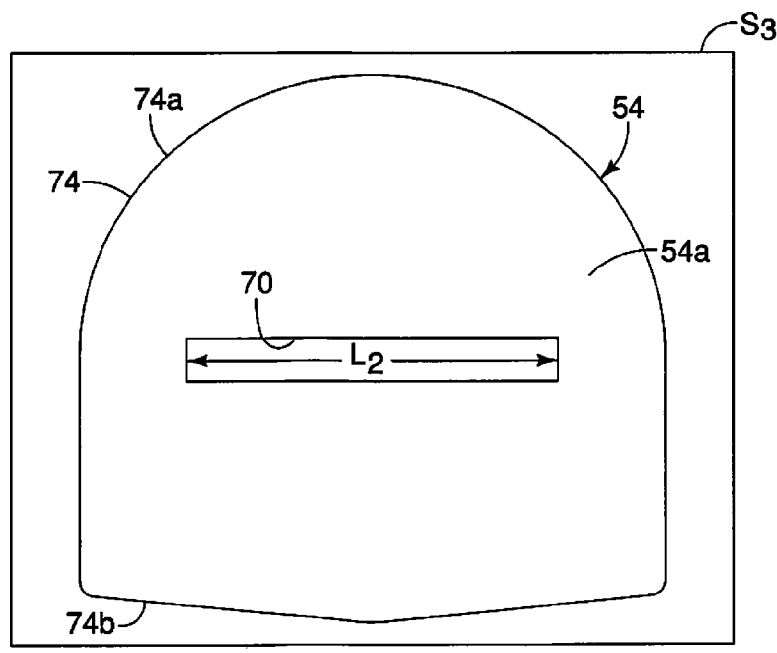
FIG. 6 is a top view of the second member of the storage tray assembly being cut from stock material showing one cut-out being formed therein in accordance with the first embodiment.

Specifically, as shown in FIG. 4, the first member 52 is cut from flat stock material $S_1$. As shown in FIG. 5, the second member 54 is cut from flat stock material $S_2$. As shown in FIG. 6, the third member 56 is cut from flat stock material $S_3$. The flat stock materials $S_1$, $S_2$ and $S_3$ each have differing thicknesses corresponding to the desired final dimensions of the first, second and third members 52, 54 and 56. For example, the first member 52 has an overall thickness that is greater than the thickness of the second member 54. Hence, the flat stock material $S_1$ is thicker than the flat stock material $S_2$.

The thickness of the third member 56 is greater than the thickness of both the first and second members 52 and 54, as least as far as the thickness of the stock material $S_3$ is concerned. Specifically, the flat stock material $S_3$ is thicker than the flat stock material $S_1$ and the flat stock material $S_2$. As is described in greater detail below, the third member 56 is rotated 90 degrees relative to its orientation after being cut from the stock material $S_3$. Therefore, the thickness of the stock material $S_3$ corresponds to the width of the third member 56 when installed into the storage tray assembly 12.

The stock materials $S_1$, $S_2$ and $S_3$ can be selected for thickness, density and strength depending on a plurality of factors, such as, for example, the size of storage tray assembly 12, and the size and weight of the tools and/or cargo to be stored therein. In the depicted embodiment, the first member 52 (the stock material $S_1$) is made from a material having a first flexural rigidity. The second member 54 (the stock material $S_2$) is made of a material having a second flexural rigidity such that the first member 52 is stiffer and resists flexing more than the second member 54. Further, the first member 52 is denser than the second member 54.

Since each of the first, second and third members 52, 54 and 56 is cut from flat stock material, each of the first, second and third members 52, 54 and 56 has opposite surfaces that are flat and parallel to one another, as described below.

Specifically, as shown in FIGS. 3, 4 and 7-8, the first member 52 has a first planar surface 52a and a second planar surface 52b that are parallel to one another. The first member 52 also has a first cut-out 60, a second cut-out 62 and a third cut-out 64, each extending from the first planar surface 52a to the second planar surface 52b. The first cut-out 60 is sized to receive the third member 56 and the jack 44, as is described in greater detail below. The second cut-out 62 is sized to receive the lug-nut wrench 46 and the third cut-out 64 is sized to receive the tow hook 48, as described in greater detail below. The first member 52 also includes an outer peripheral edge 68 that is defined between the first planar surface 52a and the second planar surface 52b. A first portion 68a of the outer peripheral edge 68 has an arcuate contour and a second portion 68b has two straight segments that define an overall V-shape.

Figure 7:
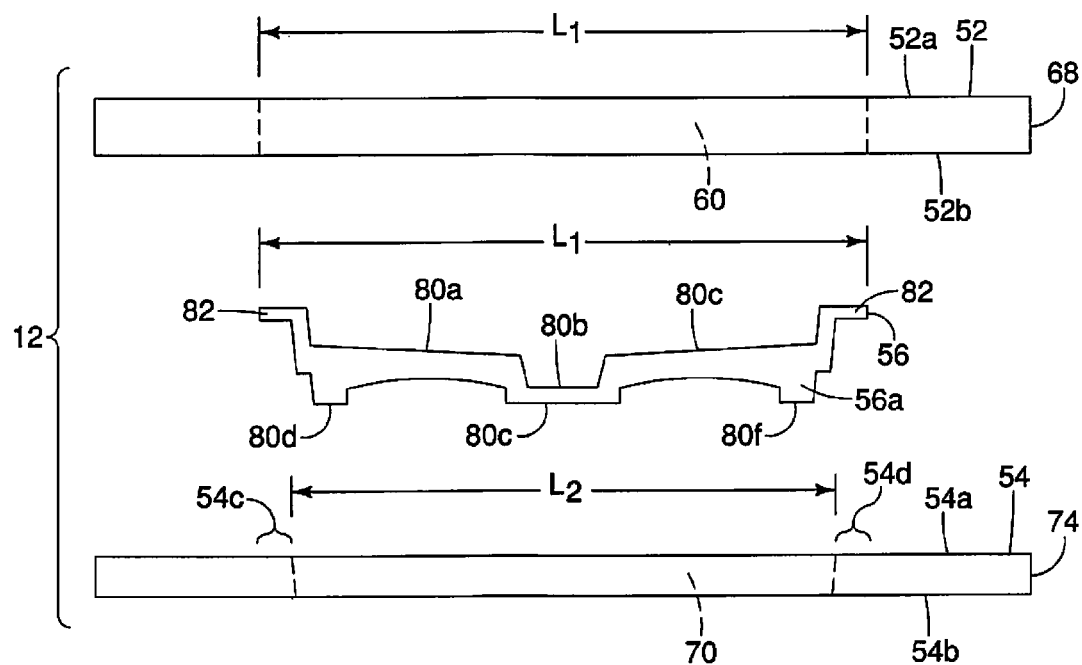
FIG. 7 is an exploded side view of the first, second and third members being aligned and assembled to form the storage tray assembly in accordance with the first embodiment.
Figure 8:
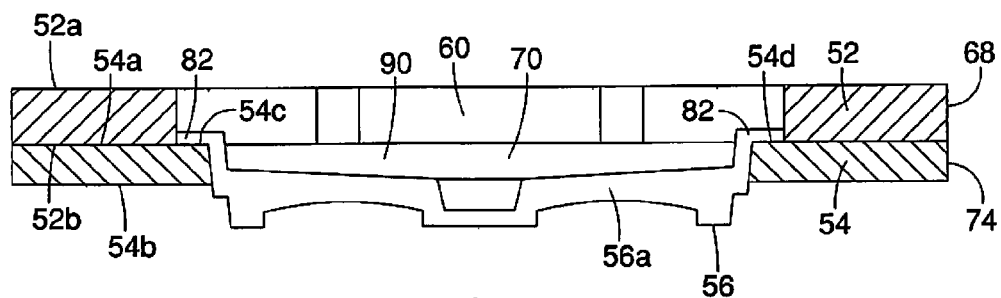
FIG. 8 is a side cross-sectional view of the storage tray assembly showing the first, second and third members aligned and assembled in accordance with the first embodiment.

As shown in FIGS. 3, 6 and 7-8, the second member 54 has a first planar surface (or overall third planar surface) 54a and a second planar surface (or overall fourth planar surface) 54b that are parallel to one another. A cut-out 70 is formed in the second member 54 extending from the first planar surface 54a to the second planar surface 54b. The second member 54 also includes an outer peripheral edge 74 that is defined between the first planar surface 54a and the second planar surface 54b. A first portion 74a of the outer peripheral edge 74 has an arcuate contour and a second portion 74b has two straight segments that define an overall V-shape. The outer peripheral edge 74 is sized and dimensioned to align with the outer peripheral edge 68 of the first member 52 with the first member 52 overlaid and attached to the second member 54, as shown in FIG. 8. Further, the cut-out 70 of the second member 54 aligns with first cut-out 60 of the first member 52 with the first member 52 overlaid and attached to the second member 54, as is also shown in FIG. 8.

However, as shown in FIGS. 4, 7 and 8, the first cut-out 60 in the first member 52 has a first overall length $L_1$. The cut-out 70 in the second member 54 has a second overall length $L_2$. The first overall length $L_1$ is longer than the second overall length $L_2$. Hence, when the first member 52 overlays the second member 54 and is aligned therewith, the first cut-out 60 is longer that the cut-out 70. As shown in FIG. 8, surface sections 54c and 54d of the first surface 54a of the second member 54 basically define ledges that support the third member 56 with the third member 56 inserted into the first cut-out 70.

With the first member 52 overlaid and attached to the second member 54, the second cut-out 62 and the third cut-out 64 of the first member 52 expose sections of the first planar surface 54a of the second member 54, thereby defining tool retaining recesses described in greater detail below. In other words, there is no cut-out provided in the second member 54 corresponding to the second cut-out 62 and the third cut-out 64 of the first member 52. Consequently, the tool retaining recesses defined by the second cut-out 62 and the third cut-out 64 of the first member 52 have depths that correspond to the thickness of the first member 52.

Figure 9:
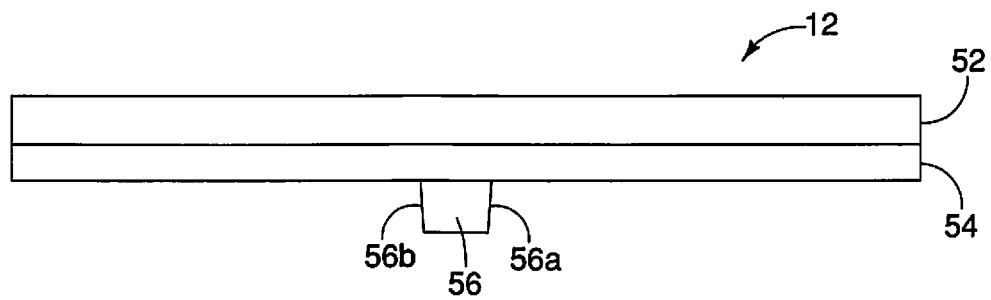
FIG. 9 is a transverse side view of the storage tray assembly in accordance with the first embodiment.
Figure 10:
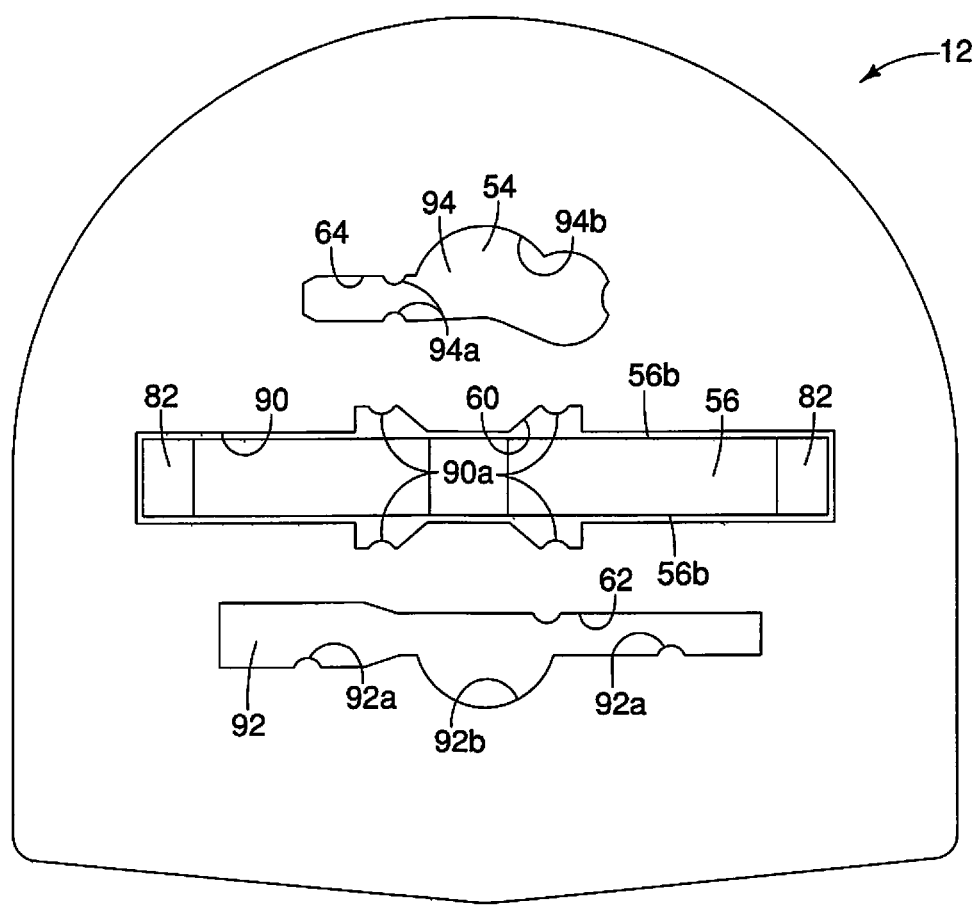
FIG. 10 is a top view of the storage tray assembly showing three concave tool storage spaces in accordance with the first embodiment.

The third member 56 has a first planar surface (or overall fifth planar surface) 56a and a second planar surface (or overall sixth planar surface) 56b that are parallel to one another, as shown in FIGS. 9 and 10. The third member 56 also includes a plurality of first shaped surfaces, such as surfaces 80a, 80b and 80c that are dimensioned to support the jack 44. The third member 56 also includes a plurality of second shaped surfaces, such as surfaces 80d, 80e and 80f that are dimensioned to contact the spare tire 40, as shown in FIG. 11. The surfaces 80a through 80f all extend from the first planar surface 56a to the second planar surface 56b. The third member 56 also includes flanges 82 formed at opposite ends thereof, as shown in FIGS. 7-10.

FIGS. 4, 5 and 6 show the first, second and third members 52, 54 and 56 of the storage tray assembly 12 in the process of being cut from flat stock materials. Specifically, in FIG. 4, the first member 52 is cut from the flat stock material $S_1$ to form the outer peripheral edge 68 thereof. Simultaneously, the first cut-out 60, the second cut-out 62 and the third cut-out 64 are cut from that portion of the stock material $S_1$ that forms the first member 52. The cutting process is performed by any of a variety of cutting apparatuses (not shown). For example, the cutting process can be performed using a die cutting device, a water jet cutting device or a wire cutting device. If a wire cutting device is employed, additional cuts (not shown) that bring the wire into position for cutting the first, second and third cut-outs 60, 62 and 64 can be made. The surfaces of the first member 52 corresponding to these additional cuts (not shown) can later be welded or adhered back together such that structural integrity is maintained and they are not easily perceivable.

In FIG. 5, the second member 54 is cut from the flat stock material $S_2$. Simultaneously, the cut-out 70 is cut from that portion of the stock material $S_2$ that forms the second member 54. Specifically, in FIG. 5, the second member 54 is cut from the flat stock material $S_2$ to form the outer peripheral edge 74 thereof. As with the cutting of the first member 52, the cutting process forming the second member 54 is performed by, for example, a die cutting device, a water jet cutting device or a wire cutting device.

In FIG. 6, the third member 56 is cut from the flat stock material $S_3$. Specifically, the first surfaces 80a, 80b and 80c, the second surfaces 80d, 80e and 80f, and the flanges 82 are cut from the stock material $S_3$. As with the cutting of the first member 52 and the second member 54, the cutting process forming the third member 56 is performed by, for example, a die cutting device, a water jet cutting device or a wire cutting device.

Next, as shown in FIG. 7, the first, second and third members 52, 54 and 56 are aligned with one another with the third member 56 being rotated 90 degrees such that the first and second planar surfaces 56a and 56b of the third member 56 are perpendicular to the first and second planar surfaces 52a and 52b of the first member 52. Further, the first and second planar surfaces 56a and 56b of the third member 56 are perpendicular to the first and second planar surfaces 54a and 54b of the second member 54. When aligned, the outer peripheral edge 68 of the first member 52 is aligned with the outer peripheral edge 74 of the second member 54. Further, as shown in FIG. 8, the first cut-out 60 of the first member 52 aligns with the cut-out 70 of the second member 54. In this assembly process, the second planar surface 52b of the first member 52 is fixed to the first planar surface 54a of the second member 54. The first member 52 is fixed to the second member 54 by, for example, an adhesive material or using an ultrasonic welding technique. Since adhesive materials and ultrasonic welding devices and techniques are conventional, further description is omitted for the sake of brevity.

In the above process, the third member 56 is inserted through the first cut-out 60 and into engagement with the second member 54. Specifically, the flanges 82 at either end of the third member 56 are brought into contact with the surface sections 54c and 54d that are exposed within the first cut-out 60 of the first member 60. The third member 56 is then welded or adhered to the second member 56 and optionally adhered to adjacent surfaces within the first cut-out 60 of the first member 52. The fully assembled storage tray assembly 12 is shown in FIGS. 8-12.

Once assembled, the first cut-out 60 of the first member 52, the cut-out 70 of the second member 54 and the first plurality of surfaces 80a, 80b and 80c of the third member 56 define a first concave storage space 90 that receives and retains the jack 44. Further, the second cut-out 62 of the first member 52 and the exposed portion of the first planar surface 54a of the second member define a second concave storage space 92. Similarly, the third cut-out 64 of the first member 52 and the exposed portion of the first planar surface 54a of the second member 54 define a third concave storage space 94.

As shown in FIG. 9, once assembled, the third member 56 at least partially extends out of the cut-out 70 in the second member 54, below the second member 54. As shown in FIG. 11, the plurality of surfaces 80d, 80e and 80f contact the spare tire 40, thereby supporting the storage tray assembly 12 above the spare tire 40.

Figure 12:
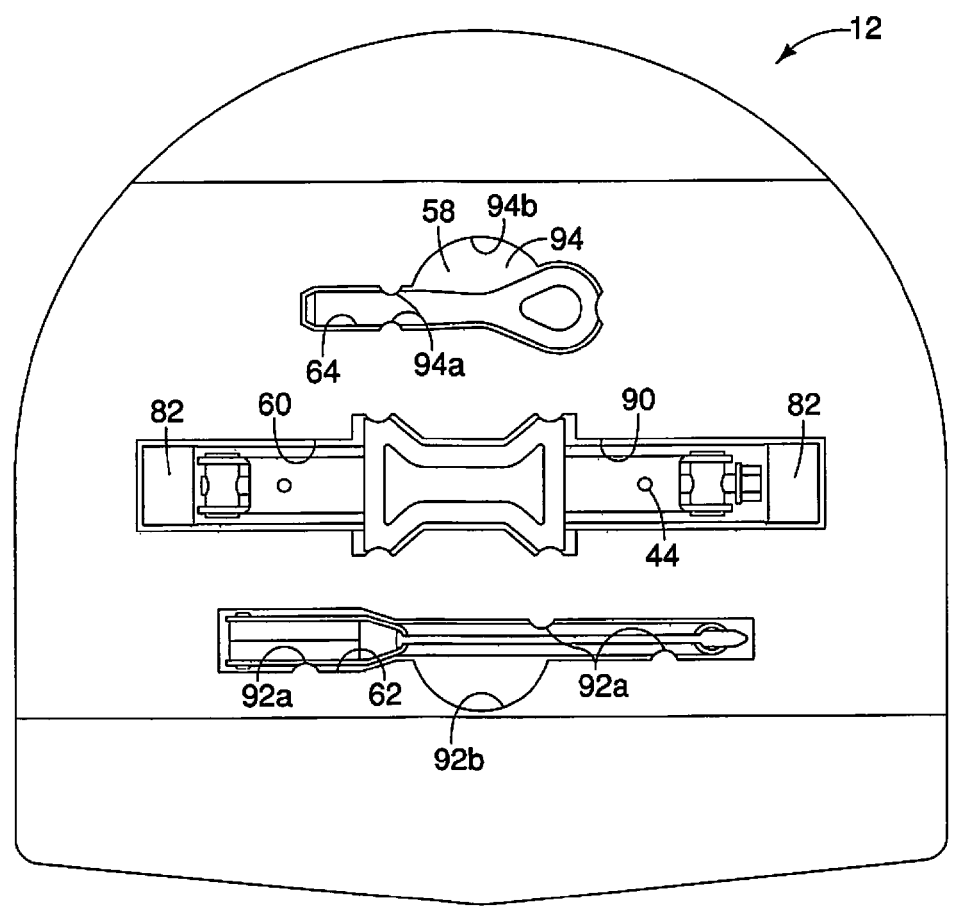
FIG. 12 is another top view of the storage tray assembly showing tools stored in the three concave tool storage spaces in accordance with the first embodiment.

As shown in FIG. 12, the jack 44 is retained in the first concave storage space 90, the lug-nut wrench 46 is retained in the second concave storage space 92 and the tow hook 48 is retained in the third concave storage space 94.

As shown in FIGS. 10 and 12, the first member 52 can optionally be formed with projections 90a as part of the first cut-out 60. The projections 90a are dimensioned and configured to contact and further retain the jack 44 when the jack 44 is inserted into the first concave storage space 90, as shown in FIG. 12. Similarly, projections 92a can be formed as part of the second cut-out 62. The projections 92a are dimensioned and configured to contact and further retain the lug-nut wrench 46 when the lug-nut wrench 46 is inserted into the second concave storage space 92, as shown in FIG. 12. The second cut-out 62 can also include a recessed area 92b that is dimensioned and configured to receive a hand of a user to facilitate removal of the lug-nut wrench 46 from the second concave storage space 92.

Further, projections 94a can be formed as part of the third cut-out 64. The projections 94a are dimensioned and configured to contact and further retain the tow hook 48 when the tow hook 48 is inserted into the third concave storage space 94, as shown in FIG. 12. The third cut-out 64 can also include a recessed area 94b that is dimensioned and configured to receive a hand of a user to facilitate removal of the tow hook 48 from the third concave storage space 94.

As described above, the storage tray assembly 12 is basically a tool storage tray for the vehicle 10. Further, the storage tray assembly 12 is configured to cover and conceal the spare tire 40 and the concave storage area 34. One advantage of the storage tray assembly 12 is that it is produced using inexpensive manufacturing techniques and methods thereby avoiding the need for expensive tools, dies and molds associated with, for instance, injection molded tool storage trays.

It should be understood from the drawings and the description herein that the storage tray assembly 12 can be dimensioned and configured for any of a variety of usages and is not limited to use within a vehicle or as a tool storage tray.

Second Embodiment

Figure 13:
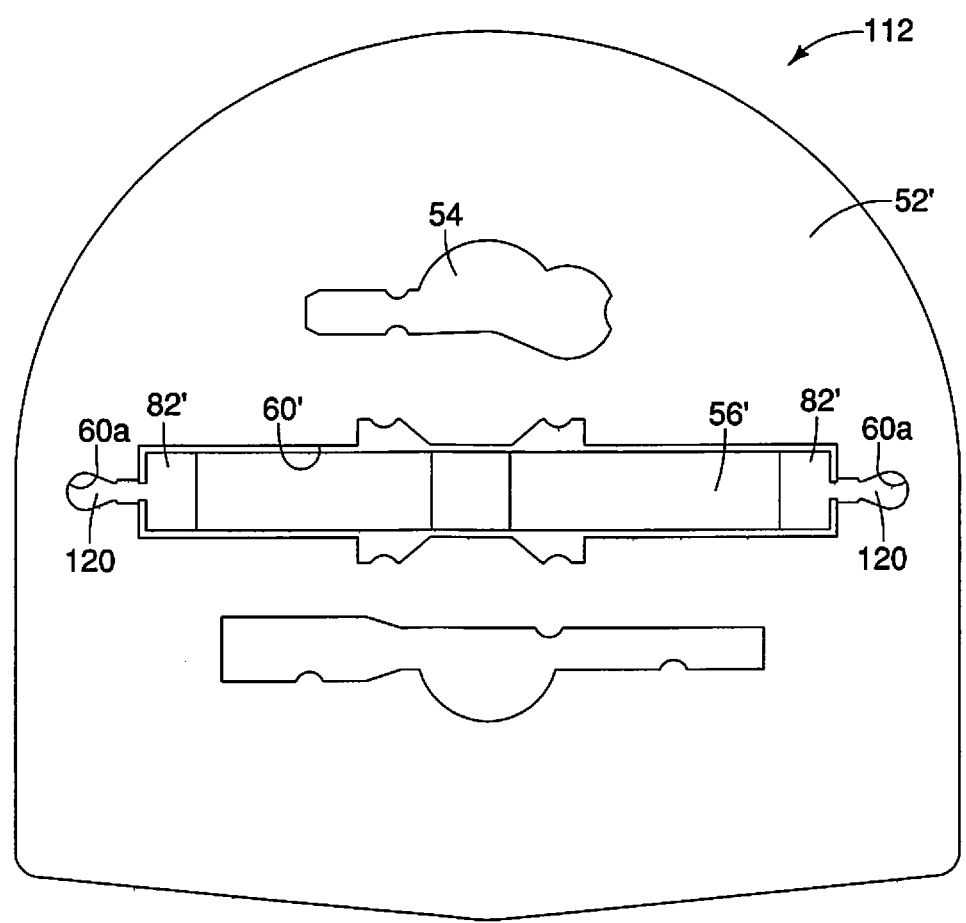
FIG. 13 is a top view of a storage tray assembly that includes three concave tool storage spaces in accordance with a second embodiment.

Referring now to FIG. 13, a storage tray assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The storage tray assembly 112 includes a first member 52' that has all of the features, cut-outs and surfaces of the first member 52 of the first embodiment, except for a modification to the first cut-out 60 of the first embodiment. Specifically, a first cut-out 60' in the first member 52' additionally includes a key-shaped recess 60a at opposite ends thereof. The second member 54 in the second embodiment is identical to that described above in the first embodiment.

In the second embodiment, the storage tray assembly 112 also includes a third member 56' that includes all of the features of the third member 56, but additionally includes key-shaped projections 120 extending from the flanges 82'. The key-shaped projections 120 are dimensioned and configured to snuggly fit into the key-shaped recesses 60a of the first member 52', thereby providing a solid connection between the first member 52' and the third member 56'. The key-shaped projections 120 can be separate attached to or integrally formed with the flanges 82'.

The vehicle 10 includes many features, elements and components that are conventional and are therefore well known in the art. Since these elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the storage tray assembly. Accordingly, these terms, as utilized to describe the present invention should be interpreted relative to a vehicle equipped with the storage tray assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle storage tray assembly comprising:
    a first member having a first planar surface and a second planar surface that are parallel to one another with a first cut-out extending from the first planar surface to the second planar surface;
    a second member having a third planar surface and a fourth planar surface that are parallel to one another with a second cut-out extending from the third planar surface to the fourth planar surface, the second cut-out being aligned with the first cut-out with the first member overlaying and being attached to the second member; and
    a third member having a fifth planar surface and a sixth planar surface that are parallel to one another, the third member having a plurality of first shaped surfaces extending from the fifth planar surface to the sixth planar surface, the third member being inserted into the second cut-out with at least a portion of the third member being restrained within the second cut-out such that the first cut-out, the second cut-out and the plurality of first shaped surfaces of the third member define a concave storage space, and the first planar surface of the first member is adhered to the third planar surface of the second member.

2. The vehicle storage tray assembly according to claim 1, wherein
    the first member is made from a material having a first flexural rigidity, and
    the second member is made of a material having a second flexural rigidity such that the first member is stiffer and resists flexing more than the second member.

3. A vehicle storage tray assembly according comprising:
    a first member having a first planar surface and a second planar surface that are parallel to one another with a first cut-out extending from the first planar surface to the second planar surface;
    a second member having a third planar surface and a fourth planar surface that are parallel to one another with a second cut-out extending from the third planar surface to the fourth planar surface, the second cut-out being aligned with the first cut-out with the first member overlaying and being attached to the second member; and
    a third member having a fifth planar surface and a sixth planar surface that are parallel to one another, the third member having a plurality of first shaped surfaces extending from the fifth planar surface to the sixth planar surface, the third member being inserted into the second cut-out with at least a portion of the third member being restrained within the second cut-out such that the first cut-out, the second cut-out and the plurality of first shaped surfaces of the third member define a concave storage space, the fifth planar surface of the third member being perpendicular to the third and fourth planar surfaces of the second member with the third member inserted into the second cut-out such that a portion of the fifth planar surface contacts one of the third and fourth planar surface and a portion of the sixth planar surface contacts the other of the third and fourth planar surface, with at least one of the plurality of first shaped surfaces defining a bottom surface of the concave storage space located below first planar surface and the second planar surface of the first member.

4. The vehicle storage tray assembly according to claim 1, wherein
the first member, the second member and the third member define a tool retaining tray within a vehicle.

5. The vehicle storage tray assembly according to claim 1, wherein
the first member includes a third cut-out that overlays the third planar surface of the second member defining a second concave storage space.

6. The vehicle storage tray assembly according to claim 5, wherein
the third cut-out defining the second concave storage space is dimensioned and shaped to correspond to shapes of a vehicle tool and further includes a recessed area adjacent to the vehicle tool with the vehicle tool inserted into the second concave storage space, the recessed area being dimensioned and configured to receive a hand of a user to facilitate removal of the vehicle tool from the second concave storage space.

7. The vehicle storage tray assembly according to claim 1, wherein
the first cut-out in the first member has a first length, the second cut-out in the second member has a second overall length that is less than the first overall length such that with the first member overlaying the second member a surface section of the second member adjacent to one end of the second cut-out is exposed within the first cut-out defining a ledge within the concave storage space.

8. The vehicle storage tray assembly according to claim 7, wherein
the third member includes a flange end that overlays the ledge with the third member inserted into the second cut-out.

9. The vehicle storage tray assembly according to claim 1, wherein
the first member includes at least one projection along a surface that defines the first cut-out, the at least one projection being configured and dimensioned to contact and retain cargo inserted into the concave storage space.

10. The vehicle storage tray assembly according to claim 1, wherein
a portion of the third member extends out of the second cut-out in a direction opposite the first member with the third member inserted into the second cut-out.

11. The vehicle storage tray assembly according to claim 1, wherein
the first member is cut such that the first cut-out is formed with a key shaped recess at one end thereof, and
the third member is shaped at one end thereof with a key-shaped projection that mates with and keys into the key-shaped recess of the first member.

12. The vehicle storage tray assembly according to claim 1, wherein
the first member and the second member include respective outer peripheral edges shaped and dimensioned to cover and conceal a vehicle concaved storage area configured to receive a vehicle spare tire.

13. The vehicle storage tray assembly according to claim 12, wherein
the third member includes a plurality of second shaped surfaces opposite the plurality of first shaped surfaces, the plurality of second shaped surfaces being configured and shaped to overlay corresponding surfaces of the vehicle spare tire.

* * * * *